United States Patent
Carlson et al.

(10) Patent No.: US 7,430,682 B2
(45) Date of Patent: Sep. 30, 2008

(54) PROCESSING IMAGE DATA FROM MULTIPLE SOURCES

(75) Inventors: Bradley Carlson, Huntington, NY (US); William Sackett, Rocky Point, NY (US); Eugene Joseph, Coram, NY (US); Duanfeng He, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 495 days.

(21) Appl. No.: 11/240,420

(22) Filed: Sep. 30, 2005

(65) Prior Publication Data

US 2007/0079029 A1    Apr. 5, 2007

(51) Int. Cl.
*G06F 1/00* (2006.01)
*G06K 9/36* (2006.01)
*H04N 9/74* (2006.01)

(52) U.S. Cl. .................. 713/500; 382/284; 348/584

(58) Field of Classification Search .................. 713/500
See application file for complete search history.

(56) References Cited

U.S. PATENT DOCUMENTS

| | | | | |
|---|---|---|---|---|
| 5,559,562 A | * | 9/1996 | Ferster | 348/584 |
| 6,141,062 A | * | 10/2000 | Hall et al. | 348/584 |
| 6,924,807 B2 | * | 8/2005 | Ebihara et al. | 345/503 |
| 7,076,097 B2 | * | 7/2006 | Kondo et al. | 382/190 |
| 7,116,353 B2 | * | 10/2006 | Hobson et al. | 348/150 |
| 7,280,124 B2 | * | 10/2007 | Laufer et al. | 345/629 |
| 2004/0146211 A1 | * | 7/2004 | Knapp et al. | 382/236 |
| 2005/0259746 A1 | * | 11/2005 | Shinde et al. | 375/240.25 |

* cited by examiner

*Primary Examiner*—Suresh K Suryawanshi
(74) *Attorney, Agent, or Firm*—Tarolli, Sundheim, Covell & Tummino, LLP

(57) ABSTRACT

Interleaving multiple logical data streams into one physical data stream reduces overhead required to process the multiple logical data streams. Multiple arrays of data values are interleaved into a combined array of data that simulates a frame of data for input to a data port such as a video port. Revised timing and synchronization signals are provided to permit transmission of the combined array according to video data port protocol. The processor includes instructions for locating the various arrays of data values within the combined array.

30 Claims, 3 Drawing Sheets

PROCESSING IMAGE DATA FROM MULTIPLE SOURCES

TECHNICAL FIELD

The invention relates to imaging and processing of target images and more particularly to the processing of image data from multiple sources.

BACKGROUND OF THE INVENTION

Various electro-optical systems have been developed for reading optical indicia, such as bar codes. A bar code is a coded pattern of graphical indicia comprised of a series of bars and spaces of varying widths, the bars and spaces having differing light reflecting characteristics. Systems that read and decode bar codes employing CCD or CMOS-based imaging systems are typically referred to as imaging-based bar code readers or bar code scanners.

The imaging bar code reader includes an imaging and decoding system including an imaging system for generating an image of a target bar code and decoding circuitry for decoding the imaged target bar code. Imaging systems include CCD arrays, CMOS arrays, or other imaging pixel arrays having a plurality of photosensitive elements or pixels. Light reflected from a target image, e.g., a target bar code is focused through a lens of the imaging system onto the pixel array. Output signals from the pixels of the pixel array are digitized by an analog-to-digital converter. Decoding circuitry of the imaging and decoding system processes the digitized signals and attempts to decode the imaged bar code.

Many modern imaging systems include a computing device that interfaces with video data. This interface is usually accomplished using a direct-memory-access (DMA) method or through a special hardware interface, such as a video port, that is part of the processor of the computing device. The object of these two approaches is to allow the computing device to process a relatively large amount of video data without overloading the computing bandwidth of the processor or the data access bandwidth of the memory bus.

Some imaging systems are designed to process data from more than one camera. Other systems process data from one or more cameras as well as packets of data about, for example, the video image being processed that has been computed by a co-processor. Some examples of co-processors include FPGA, ASICs, and DSPs. The use of co-processors allows the imaging system to be designed with relatively simple and inexpensive microprocessors.

While cost effective, inexpensive microprocessors tend to have limited bandwidth interfaces to external devices. These microprocessors usually include a video port that is a high bandwidth interface that is configured to accept data in a digital video format. In the digital video format the data is organized in a contiguous block, thus allowing the processor to accept all data with minimum effort in handshaking, even if the data is transmitted in multiple, discontinuous transmission sessions. Allowing discontinuous video transmission frees up the processor bandwidth to access and process data between these sessions, while at the same time reducing the amount of data that the sending component must buffer.

In imaging systems with multiple systems or additional data to be processed, the overhead involved in switching between the different data destinations may be so high that the use of an inexpensive microprocessor is not feasible.

SUMMARY OF THE INVENTION

Interleaving multiple logical data streams into a one physical data stream reduces overhead required to process the multiple logical data streams. Data from at least two sources is transmitted to a processor via a single video or other high-speed port such as an IEEE 1394 or "Firewire" port, DMA chanel, USB port, or other peripheral device that is configured to receive successive frames of data according to concurrently received timing signals. A first array of data, such as a frame of pixels, is received from a first data source such as a camera having a first frame rate and a second array of data is received from a second data source such as a camera or logical component that provides statistics about the first array of data. The first and second arrays of data are interleaved to form a combined array of data. One or more timing signals are synthesized such that the combined array of data can be transmitted at a synthesized data transmission rate that is usually higher than the first rate to allow the system to keep up with the data being produced by the first data source. The combined array of data is transmitted to the processor according to the synthesized timing signals to enable transmission of the combined array of data as a simulated single frame of data.

The processor can be programmed to locate the first and second arrays of data from within the combined array of data after the transmission is made. In the case where the port is a video port, the timing signals can include a synthesized pixel rate and horizontal and vertical synchronization pulses.

These and other objects, advantages, and features of the exemplary embodiment of the invention are described in detail in conjunction with the accompanying drawings.

BRIEF DESCRIPTION OF THE DRAWINGS

FIG. 2b illustrates one data format that can be used according to the embodiment of the present invention shown in FIG. 2a;

FIG. 3b illustrates one data format that can be used according to the embodiment of the present invention shown in FIG. 3a.

DETAILED DESCRIPTION

Figure 1:
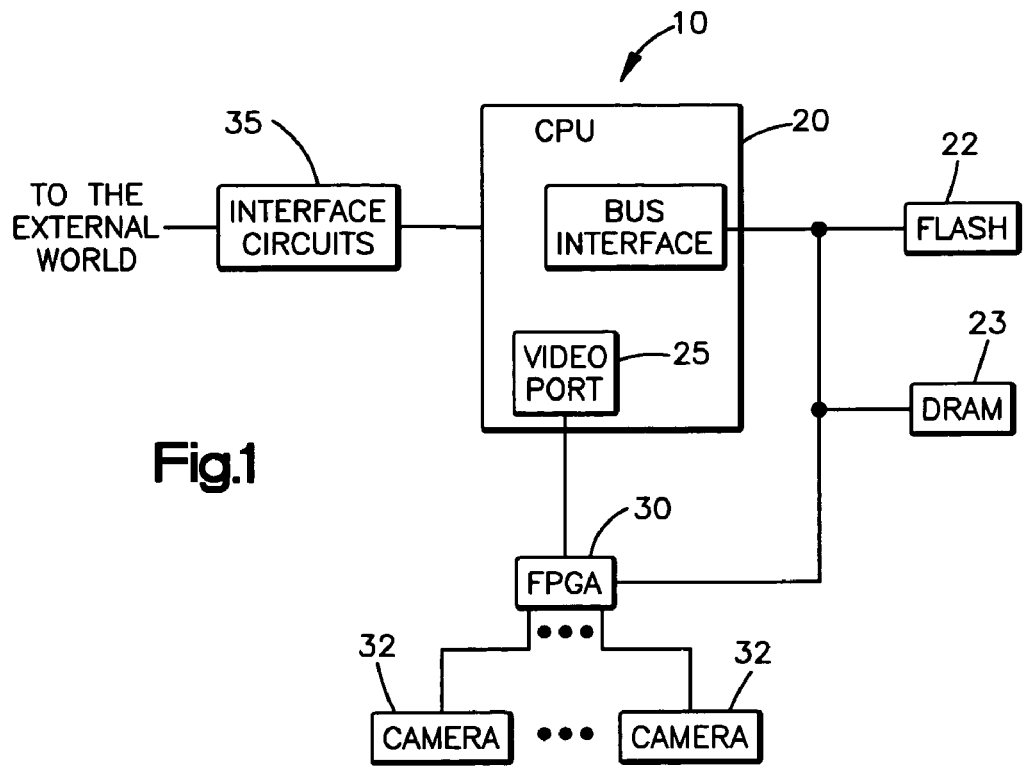
FIG. 1 is a block diagram of functional components of an imaging scanner system that can be used to practice an embodiment of the present invention.

Referring to FIG. 1, a block diagram 10 of various electric circuits and circuit boards that can be employed as part of an imaging system to interleave multiple streams of data into a single video stream is shown. A microprocessor or CPU 20 receives digital signals from an FPGA circuit 30. The FPGA acquires image data from one or more sensor circuits, such as those in cameras 32 and computes statistical data about the image data. As will be described, the FPGA provides an augmented version of the image data that includes the statistical data through a video port 25 to the CPU 20. The FPGA also provides necessary timing signals to the video port. The CPU may also communicate by data line Flash memory 22 and DRAM memory 23, which comprise a computer-readable media, on which data and software for the system are stored. This information may include decoded data from a target optical code. The CPU transmits information to external components via interface circuits 35. One example of information that may be transmitted is video data for display on a monitor. For the purposes of this description imaging systems that employ one or three cameras are shown as examples, however it will be apparent to one of skill in the art that any number of cameras can be employed in practice of the invention. Additionally, other electrical circuits, boards, and processing units can be used to perform the various functions described herein.

In order to decode barcodes, an imaging scanner often uses a set of statistics from the image. The CPU uses the statistical information to identify portions of the image that likely contain the barcode or target. One example of a scanning system that employs statistics in the processing of images containing barcodes can be found in U.S. Pat. No. 6,340,114 to Correa et al. and assigned to the assignee of the present invention, which is incorporated herein by reference in its entirety. In some imaging scanners the statistics are computed in software on an as-needed basis to identify the barcode in the image. This process of computing the statistics is relatively slow and generally not acceptable for high-speed scanners, especially those that include more than one camera. For these high speed cameras the image statistics can be computed in hardware by a custom component such as an FPGA on the video data as it is acquired from the camera. In this manner the statistics for all regions of the image can be computed in the same time it takes to acquire the image from the camera. However, the statistics must still be communicated to the CPU along with the video data.

Many CPUs have external DMA channels to efficiently transfer data to memory from an external device. However, when data is to be routed to different destinations, such as one or more streams of simultaneously generated video and statistics data, one DMA channel per data stream is usually required. Thus, each DMA channel is set up once and receives a large block of data that is sent in multiple small pieces to be stored sequentially in the CPU's memory. As the number of external data sources, such as cameras, increases the number of DMA channels may become a limiting factor in the capability of the CPU to receive data. For example, in many cases communications between the processor and an external device, such as a host computer or the internet, may require the use of a DMA channel. Therefore, it would be advantageous to use a single DMA channel for all camera data, even when multiple data streams are present. However, it would also be preferable that the DMA channel need not be set up multiple times (such as hundreds of times) within one image frame time, because each set up process is relatively expensive in terms of time and processing resources.

One possible approach to importing data into the CPU from multiple data sources is to use external memory to buffer the streams of data so that they are delivered to the CPU when large contiguous segments of data become ready to be sent. For example, if data corresponding to one complete frame of the image is buffered for each of two video streams, it is feasible to send the data to the CPU as two consecutive frames, each in a contiguous segment or together in a single segment. This technique reduces the overhead of DMA set up, however external memory for such a large amount of buffering can be prohibitively expensive.

Another solution to importing data from multiple sources on a single DMA channel is to interleave the multiple logical data streams into one physical data stream with very limited buffering for each of the logical data streams. The combined physical data can be transported into one contiguous block of processor memory. By organizing the data into one large stream (and memory block) the amount of overhead to switch between data streams is reduced significantly.

Certain inexpensive processors, such as the Freescale® MC9328MXL, lack sufficient support for efficient external DMA channels. One feasible way to input the large amount of data in the image and its statistics to the CPU is through the video or camera interface port. The video port is designed to accept only one video stream at a time, although there is often flexibility to define the video format, including the video frame size. When there is more than one data stream, such as one video stream plus one stream of statistics, the several data streams can be interleaved to form one physical stream of data. In the same way, video streams from multiple cameras can be interleaved into one stream, in the format of a video stream with a larger video frame, for communication through the video port. This technique works on any processor with a camera interface (digital video) port, and is especially advantageous when the digital video port is the only high bandwidth external interface. For example, this approach may be particularly useful in camera-enabled mobile phones where multiple cameras are deployed, or to improve the barcode reading performance of camera-enabled phones. The described embodiment communicates the resulting physical data stream through a video or camera port. However, the resulting physical data stream can be communicated through any high speed DMA channel, USB port, IEEE 1394 port, or other peripheral interface of a CPU.

Figure 2A:
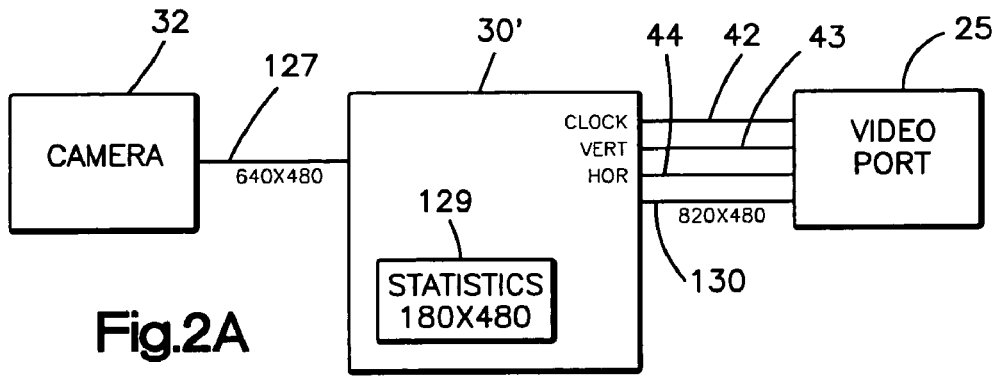
FIG. 2a is a functional block diagram illustrating the operation of imaging scanner processing components during practice of an embodiment of the present invention.
Figure 2B:
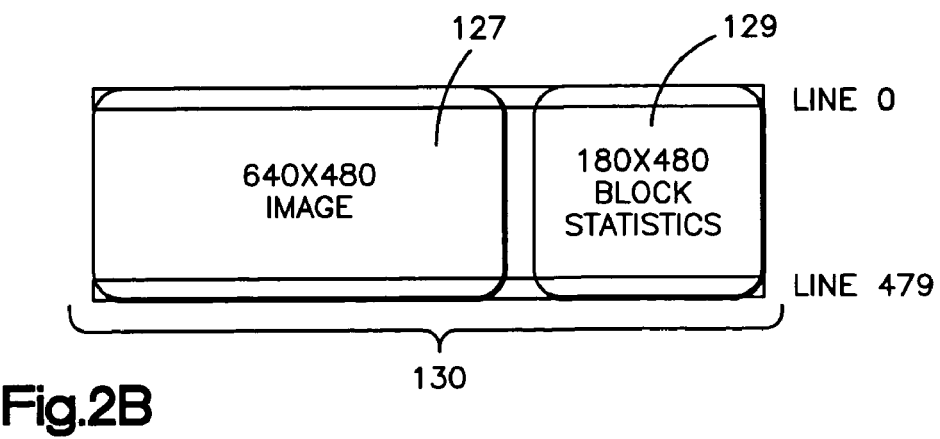

FIG. 2A illustrates an imaging system in which image data 127 from a single camera 32 and statistical data 129 from an FPGA 30' that computes statistics on the data from the camera are interleaved to form a single block of data 130 that is formatted to simulate video data from a single 820 ×480 pixel video frame. The resulting interleaved data format is shown in FIG. 2B. The statistics 129 are computed on 8×8 pixel blocks of the image resulting in an array of 80×60 blocks of statistics for the 640×480 VGA image 127. Each block of statistics contains 18 bytes of data resulting in 80×60×18=86,400 bytes of statistics data per image. The logic in the FPGA 30' buffers enough of the image to compute the statistics and outputs the image data and statistics data interleaved with each other. The output is formatted as video data so that it can be efficiently transferred to the CPU's memory through the CPU's video or camera interface port 25. The FPGA receives the image (in this case 640×480 pixels) from the camera 32 using the pixel clock horizontal and vertical synchronization signals of the camera. The FPGA synthesizes a new pixel clock having a signal shown as 42, and horizontal and vertical synchronization signals 44, 43 that correspond to an image size of 820×480 pixels (the original 640×480 image and 180×480 statistics). The rate of the new pixel clock is greater than the rate of the camera's pixel clock so that the synthesized video stream has a frame rate equal to that of the camera. In other words, if the camera takes 33 milliseconds to transfer its 640×480 image to the FPGA, then the FPGA needs to take approximately 33 milliseconds to transfer its 820×480 pixel augmented image to the CPU. The synthesized pixel clock is faster than the pixel clock of the camera, and the synthesized horizontal synchronization signal, which signifies each line of the frame, is maintained high once for each 820 pixel clocks. The vertical synchronization signal is high for 480 lines just like that of the camera.

Figure 3A:
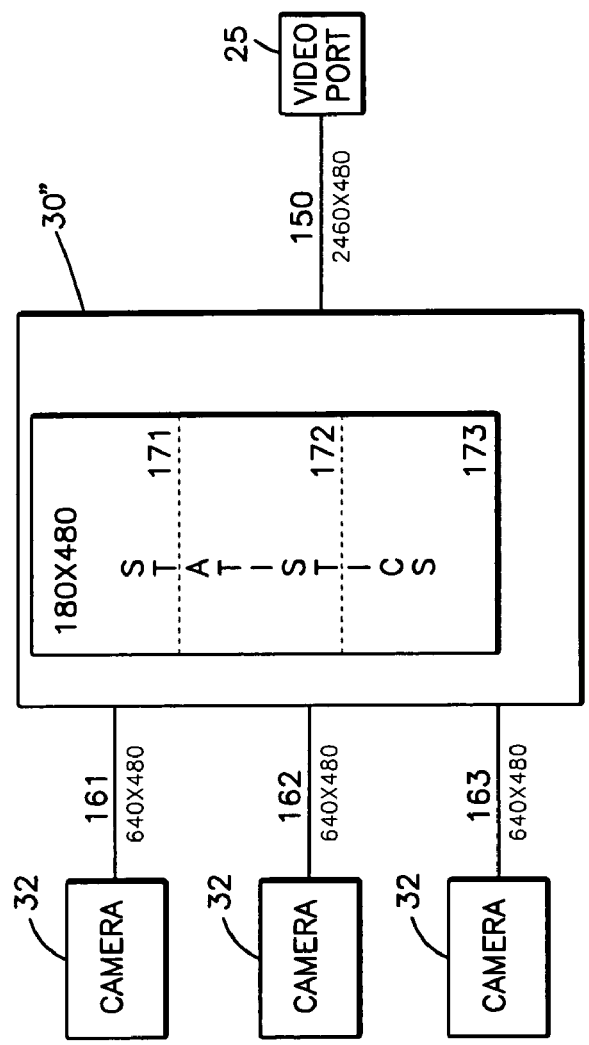
FIG. 3a is a functional block diagram illustrating the operation of imaging scanner processing components during practice of an embodiment of the present invention.
Figure 3B:
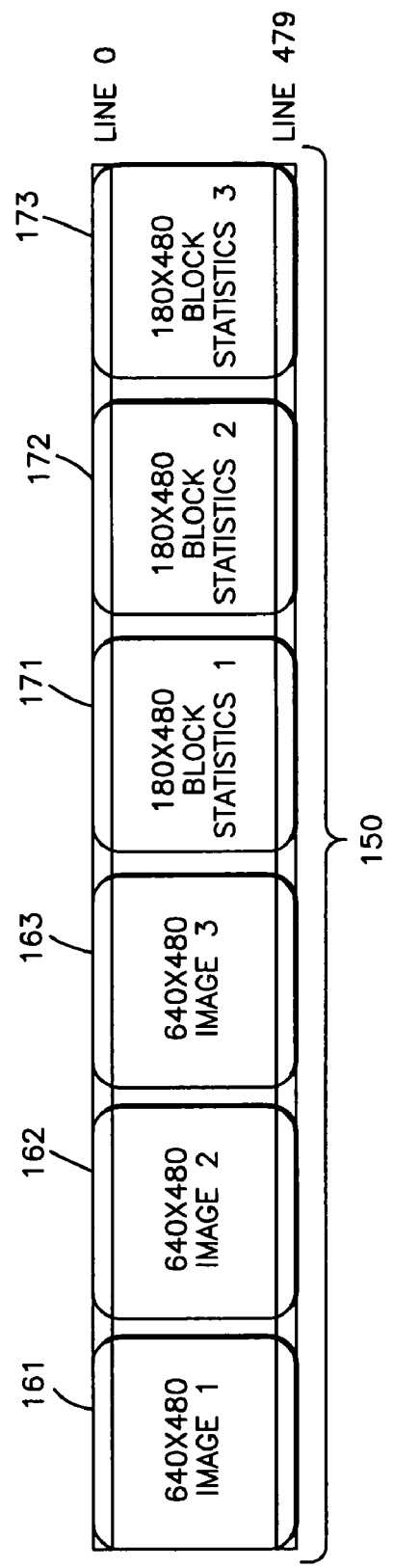

FIGS. 3A and 3B show an imaging system in which data from three cameras are interleaved. FIG. 3B shows one possible format for a data block 150 used to input image data 161, 162, 163 and statistics 171, 172, 173 from three cameras into a single video port. The video port of a typical CPU is capable of operating up to 48 MHz. The amount of data that must be transferred per second for the three camera/statistics configuration is ((640×480 (for the image)+180×480 (for the statistics))bytes/frame×3 cameras×30 frames/second) or approximately 35.4 MB/second. Since the video port accepts one byte of data at a time, there is sufficient bandwidth to pass the data and statistics from three cameras to the processor through the video port. The FPGA acquires images from the three cameras in parallel, and the FPGA computes the statistics on the 3 images. The synthesized horizontal synchronization signal is active for 2460 pixel clocks.

The organization of the interleaved data is determined by the FPGA and can be arbitrarily selected to fit a particular need. The formats shown in FIGS. 2B and 3B are configured such that when the interleaved data is received by the CPU it does not have to de-interleave it. The CPU's software is written using memory pointers and appropriate pointer arithmetic to access the data from its acquired place in memory. For example, the series of blocks of image data 127 in FIG. 2B is no longer stored in a contiguous block, but can still be accessed as a 2-dimensional array as usual, except that certain addressing methods must change. For example, from a given pixel the one below it is offset by (640+180) pixels instead of 640.

Figure 4:
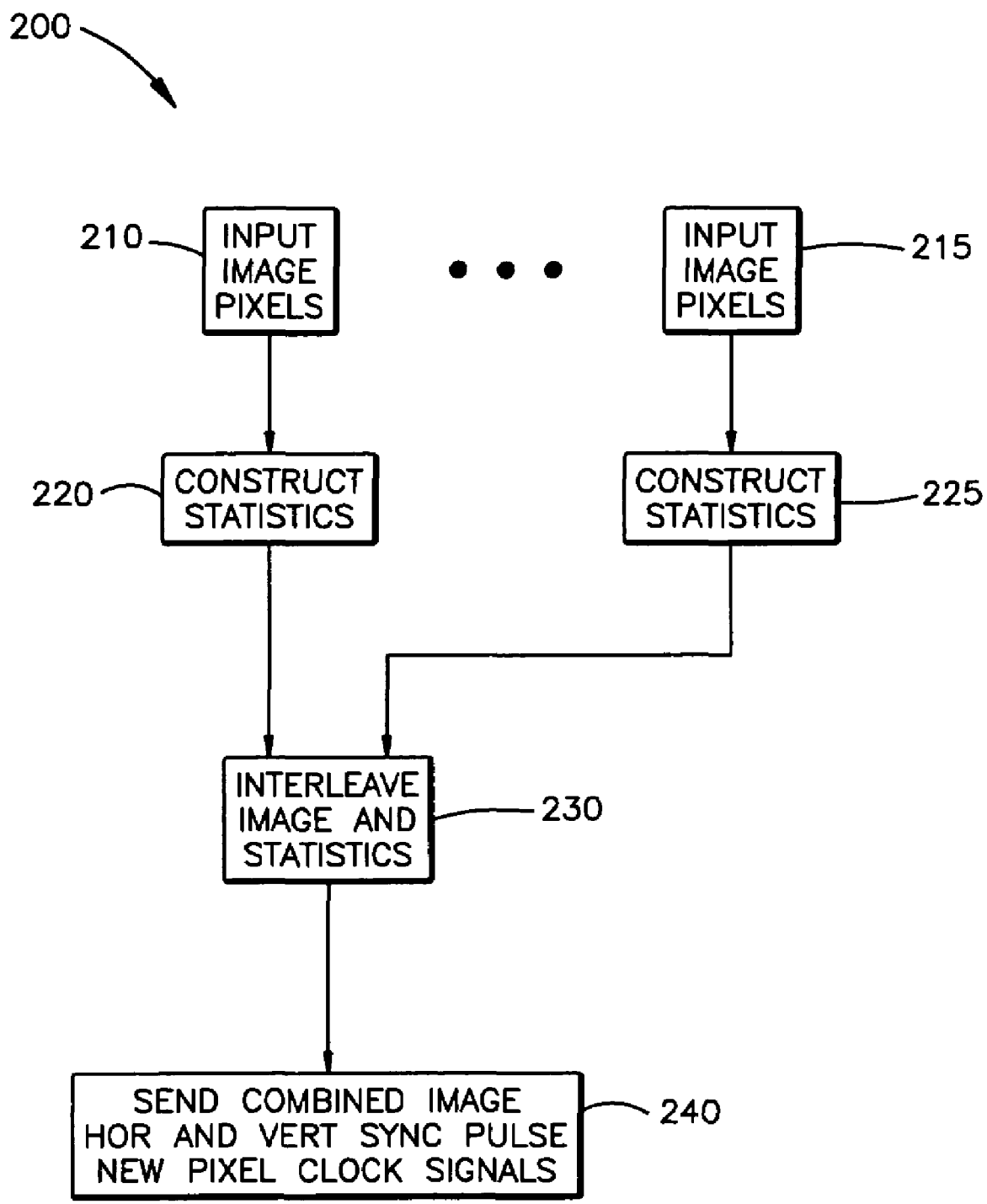
FIG. 4 is a flowchart representation of a method for processing multiple data streams according to one embodiment of the present invention.

One possible method 200 that can be employed by the FPGA to construct simulated video data for input into a video port is shown in flowchart form in FIG. 4. The FPGA has logic components that are configured ahead of time to interleave the image and statistics data as well as send the necessary timing signals to the video port based on the expected size of the image and statistic data that will be encountered in the particular application. At 210 and 215 image pixels are input and at 220 and 225 statistics are computed. At 230 the image and statistics data are interleaved into an augmented video frame and at 240 the simulated video image and appropriate horizontal and vertical synchronization signals as well as the timing signals from the revised pixel clock are provided to the processor via the video port.

It can be seen from the foregoing description that interleaving multiple logical data streams and formatting them as a simulated single frame of data can allow the transfer of large quantities of data from multiple sources into a CPU using a single video port. Although the invention has been described with a certain degree of particularity, it should be understood that various changes can be made by those skilled in the art without departing from the spirit or scope of the invention as hereinafter claimed.

We claim:

1. A method that transmits data from at least two sources to a processor via a single port, wherein the port is configured to receive successive frames of data according to concurrently received timing signals:

receiving a first array of image data from a first data source having a first frame rate; receiving a second array of data from a second data source, the second array of data including statistics generated by the second data source regarding the first array of image data from the first data source;

interleaving the first and second arrays of data to form a combined array of data, the combined array of data being formatted as simulated video data comprising a video frame; synthesizing one or more timing signals such that the combined array of data can be transmitted at the first frame rate; and transmitting to the processor the combined array of data according to the synthesized timing signals; and providing to the processor the synthesized timing signals to enable transmission of the combined array of data as simulated video data comprising a video frame.

2. The method of claim 1 wherein the first array of image data is generated by a first video camera and the second array of data is generated by a logical processing unit, the logical processing unit further generating the combined array of data.

3. The method of claim 2 wherein the logical processing unit generates a pixel clock having a rate that is greater than the rate of the first data source such that a synthesized data stream generated by the logical processing unit has a frame rate substantially equal to that of the first data source.

4. The method of claim 1 wherein the port is a video port.

5. The method of claim 1 wherein the port is an IEEE 1394 port.

6. The method of claim 1 wherein the port is a DMA channel.

7. The method of claim 1 wherein the port is a USB port.

8. The method of claim 1 comprising storing instructions in the processor for locating the first and second data array within the combined array of data.

9. The method of claim 8 wherein the instructions specify an offset between successive datum values for a given datum in the first array of data that compensates for the presence of the second array of data in the combined array of data.

10. The method of claim 1 wherein the timing signals are synthesized by creating a revised clock having a revised data transfer rate that is greater than a first data source data transfer rate such that the combined array of data can be transmitted in the same amount of time as it takes the first data source to output the first array of data.

11. The method of claim 4 wherein the first and second data arrays include pixels.

12. The method of claim 10 wherein the timing signals are synthesized by creating a revised horizontal synchronization pulse that remains in the data receiving enable state long enough for all of the pixels in the combined array of pixel data to be transmitted.

13. An apparatus for processing image data of a target comprising:

a processor having a data port that is configured to receive successive arrays of data according to timing signals;

at least one camera for obtaining a first array of image data corresponding to the appearance of the target at a first frame rate;

a second data source that provides a second array of data, the second array of data including statistics generated by the second data source regarding the first array of image data from the at least one camera;

a frame simulator that interleaves data from the at least one camera and the second data source to form a combined array of data, the combined array of data being formatted as simulated video data comprising a video frame; and a timing signal synthesizer that provides timing signals to permit transmission of the combined array of data to the processor as simulated video data comprising a video frame at the first frame rate.

14. The apparatus of claim 13 wherein the timing signals include clock signals and horizontal synchronization pulses.

15. The apparatus of claim 14 wherein the timing signal synthesizer includes a clock that provides timing signals to permit transmission of the combined array of data at the first frame rate.

16. The apparatus of claim 14 wherein the timing signal synthesizer includes a horizontal synchronization pulse generator that provides a horizontal synchronization pulse to permit transmission of the combined array of data.

17. The apparatus of claim 13 wherein the timing signal synthesizer generates a pixel clock having a rate that is greater than the rate of the first data source such that a synthesized data stream generated by the logical processing unit has a frame rate substantially equal to that of the first data source.

18. The apparatus of claim 13 wherein the second data source is a logical processing unit that computes and outputs an array of data summarizing information about the first array of data.

19. The apparatus of claim 13 wherein the data port is a video port.

20. The apparatus of claim 13 wherein the data port is an IEEE 1394 port.

21. The apparatus of claim 13 wherein the data port is a USB port.

22. The apparatus of claim 13 wherein the data port is DMA channel.

23. The apparatus of claim 18 wherein the logical processing unit is a field-programmable gate array (FPGA).

24. The apparatus of claim 19 wherein the data includes pixels.

25. Computer readable media having computer-executable instructions stored thereon for performing a method that transmits data from at least two sources to a processor via a single port, wherein the port is configured to receive successive frames of data according to concurrently received timing signals, the instructions comprising:
receiving a first array of image data from a first data source having a first frame rate; receiving a second array of data from a second data source, the second array of data including statistics generated by the second data source regarding the first array of image data from the first data source;
interleaving the first and second arrays of data to form a combined array of data, the combined array of data being formatted as simulated video data comprising a video frame; synthesizing one or more timing signals such that the combined array of data can be transmitted at the first frame rate; and
transmitting to the processor the combined array of data according to the synthesized timing signals; and providing to the processor the synthesized timing signals to enable transmission of the combined array of data as simulated video data comprising a video frame.

26. The computer readable media of claim 25 wherein the instructions comprise storing instructions in the processor for locating the first and second data array within the combined array of data.

27. The computer readable media of claim 25 wherein the instructions comprise specifying an offset between successive datum values for a given datum in the first array of data that compensates for the presence of the second array of data in the combined array of data.

28. The computer readable media of claim 25 wherein the instructions comprise synthesizing the timing signals by creating a revised clock having a revised data transmission rate that is greater than a first data source data transmission rate such that the combined array of data can be transmitted in the same amount of time as it takes the first data source to output the first array of data.

29. The computer readable media of claim 25 wherein the instructions comprise synthesizing the timing signals by creating a revised horizontal synchronization pulse that remains in the data receiving enable state long enough for all of the data in the combined array of data to be transmitted.

30. An apparatus for processing video image data of a target comprising:
a processor having a data port that is configured to receive successive arrays of data according to timing signals;
first data source means for obtaining a first array of image data corresponding to the appearance of the target at a first frame rate;
a second data source means that provides a second array of data, the second array of data including statistics generated by the second data source means regarding the first array of image data from the first data source means;
means for interleaving image data from the first data source means and data from the second data source means to form a combined array of data, the combined array of data being formatted as simulated video data comprising a video frame; and
means for providing timing signals to permit transmission of the combined array of data to the processor as simulated video data comprising a video frame at the first frame rate.

* * * * *

UNITED STATES PATENT AND TRADEMARK OFFICE
CERTIFICATE OF CORRECTION

| | | |
|---|---|---|
| PATENT NO. | : 7,430,682 B2 | Page 1 of 1 |
| APPLICATION NO. | : 11/240420 | |
| DATED | : September 30, 2008 | |
| INVENTOR(S) | : Carlson et al. | |

It is certified that error appears in the above-identified patent and that said Letters Patent is hereby corrected as shown below:

IN THE CLAIMS

In Column 7, Line 24, in Claim 25, delete "Computer" and insert -- A computer --, therefor.

Signed and Sealed this

Twenty-fourth Day of November, 2009

David J. Kappos
*Director of the United States Patent and Trademark Office*